United States Patent [19]

Bravenec

[11] Patent Number: 4,484,139
[45] Date of Patent: Nov. 20, 1984

[54] ZOOM GUARD RESISTIVITY LOGGING SYSTEM FEATURING RESISTOGRAM PROFILE

[75] Inventor: Frank R. Bravenec, Houston, Tex.

[73] Assignee: Halliburton Company, Duncan, Okla.

[21] Appl. No.: 369,378

[22] Filed: Apr. 19, 1982

[51] Int. Cl.³ .............................................. G01V 3/24
[52] U.S. Cl. .................................... 324/366; 324/347; 324/355
[58] Field of Search ............... 324/347, 354, 355, 357, 324/366, 367, 371, 373–375

[56] References Cited

U.S. PATENT DOCUMENTS

| | | | |
|---|---|---|---|
| 2,172,778 | 9/1939 | Taylor | 324/354 |
| 2,183,565 | 12/1939 | Hawley | 324/355 |
| 2,605,321 | 7/1952 | Owen | 324/373 |
| 2,654,064 | 9/1953 | Broding | 324/366 |
| 2,704,347 | 3/1955 | Doll | 324/347 |
| 2,986,693 | 5/1961 | Alder | 324/371 |
| 3,076,138 | 1/1963 | Stelzer | 324/366 |
| 3,096,477 | 7/1963 | Smith et al. | 324/373 |
| 3,902,113 | 8/1975 | Bridges et al. | 324/366 X |
| 4,412,180 | 10/1983 | Desbrandes | 324/373 |

Primary Examiner—Gerard R. Strecker
Attorney, Agent, or Firm—William J. Beard

[57] ABSTRACT

In a resistivity logging system, the preferred and illustrated embodiment features a downhole well logging tool utilizing central current emitting electrode flanked symmetrically with a number of small electrodes above and below the central electrode. A switching system is included for switching symmetrical pairs of electrodes into parallel with the central electrode thereby increasing the effective field acting on the current flow. The current flow penetrates radially outwardly into the earth's formations in relation to the relative length of the array of electrodes, thereby enabling a sweep to yield borehole resistivity and deep formation resistivity. The data is preferably presented in a resistogram profile.

6 Claims, 4 Drawing Figures

ZOOM GUARD RESISTIVITY LOGGING SYSTEM FEATURING RESISTOGRAM PROFILE

BACKGROUND OF THE DISCLOSURE

This disclosure relates to improvements in resistivity logging systems. A resistivity log is obtained by measuring the resistance at an electrode emitting current flow from a downhole logging tool which current flows into the adjacent formations of the earth. The current flow penetrates into the earth. The depth of penetration is an important factor. Shallow penetration provides the borehole resistivity, or the resistivity observed within a few inches of the borehole. In large part, the borehole resistivity is altered or impacted in some fashion by the presence of the borehole and the drilling mud in the borehole. By contrast, it is also desirable to obtain the resistivity of the earth's formations deep into the formations at some distance from the borehole. This is a measure of the resistivity of the undisturbed formations. As will be understood, these resistivity values are important for different reasons. The goal in resistivity logging is to obtain indications of resistivity which are used to infer values of porosity, permeability, and fluid saturation. It is helpful to have both data close to the borehole and form the deep formations.

Deep formation resistivity measurements are difficult to obtain because the current flow inevitably turns upwardly and does not penetrate deeply into the adjacent formations. The current flows from the emitting electrode supported on the downhole tool into the earth's formations and is returned to a grounding electrode near the wellhead. The grounding electrode defines the return path which is, on the ordinary scale of wells, more or less parallel to the well. This is especially true when logging at depths commonly encountered in most wells. The current flow is primarily parallel to the borehole in returning to the electrode because the current seeks the least resistant path to return to the electrode, and this is typically the shortest path.

The current can be forced to travel further from the tool and deeper into the earth's formation by using a longer emitting electrode. Assume that the electrode is maintained at a typical operating voltage and is made as long as practicality permits. In that event, the current is forced to flow radially outwardly under the influence of the field from the relatively long electrode. This is desirable to get deep formation penetration. On the other hand, deep penetration serially adds resistance to the measured value and therefore obscures the resistivity up close to the wellbore. Close in borehole resistivity measurements are best obtained from a relatively narrow electrode which permits the current flow to bend upwardly in returning to the grounding electrode.

The apparatus and method of this disclosure set forth a means and method whereby resistivity measurements can be obtained from the adjacent borehole and from deep formations. These measurements are obtained while the resistivity logging system is pulled through the wellbore at typical operating velocities. For instance, a logging rate of one hundred feet per minute is typical. This apparatus obtains resistivity measurements from deep formation as well as the borehole while logging at that rate and presents such measurements in a manner enabling the log interpretation to be carried out easily.

Log interpretation is enhanced by presenting the data in a resistogram plot. The deep formation data is located at one side of the chart or graph. The remaining side includes the resistivity from the borehole area, and the intermediate values are located in a more or less linear fashion in the resistogram graph.

With the foregoing in view, the present disclosure presents a resistivity logging system featuring a central electrode of relatively narrow vertical dimensions symmetrically flanked above and below by electrode pairs. They are preferably equal in length arranged on uniform spacing. The number of electrodes above and below the central electrode can be varied but ten is believed to be an adequate number. The electrodes are normally not connected with the central electrode. They are switched on in pairs so that the central electrode is first operated alone and then additional pairs of electrodes are connected in parallel with it. So to speak, a time variant electrode of ever increasing vertical dimension is accomplished. It is swept at a specified rate. The resistivity measurement obtained from the system is synchronized with the effective width of the emitting array of electrodes to thereby correlate the measured resistivity with the sweep, and this yields data of the borehole resistivity and deep formation resistivity with intermediate values therebetween.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE PREFERRED EMBODIMENT

Figure 1:
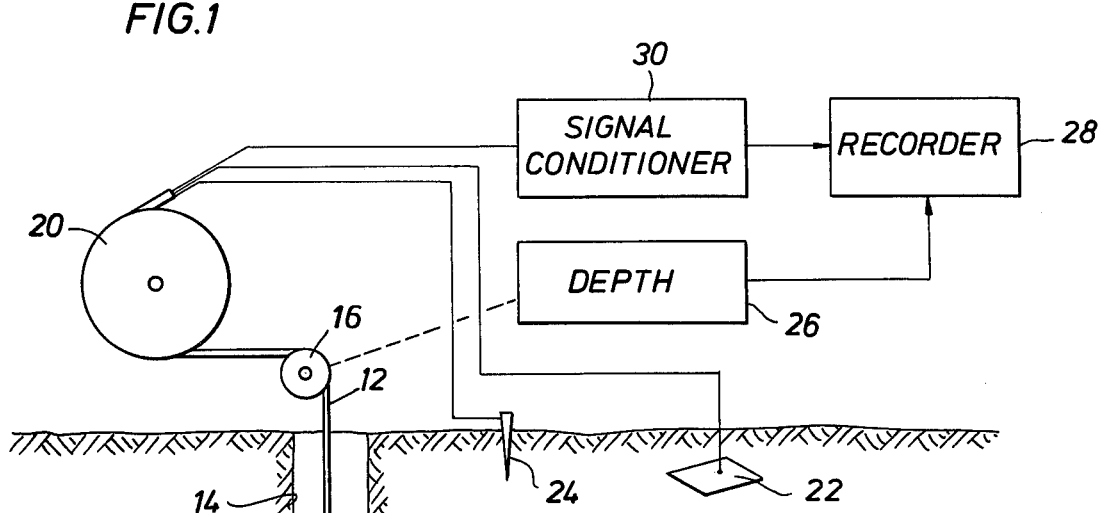
FIG. 1 shows a resistivity logging system featuring an emitting electrode array to enable variation in effective electrode width to thereby alter current penetration into the adjacent earth's formations.
Figure 1:
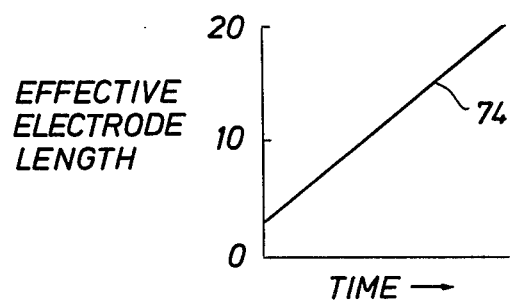

Attention is first directed to FIG. 1 of the drawings. A downhole well logging tool 10 constructed in accordance with this disclosure is supported on a logging cable 12 in a wellbore 14. The well is any typical depth achieved during drilling operations, and the tool 10 is lowered into the open hole to make resistivity measurements. A pulley 16 supports the logging cable 12 and enables it to be raised to retrieve the logging tool 10. The logging cable 12 is spooled on a drum 20. The drum stores a length of cable (as much as 25,000 feet) to enable the tool to be lowered to the bottom. The length of cable can be varied depending on requirements.

The logging cable encloses several conductors. It is a multi-conductor sheathed cable. One of the conductors enables connection with a current return grounding electrode 22. This electrode completes the circuit for the current flow which is used in measuring resistivity. In addition to this, there is a voltage reference electrode 24 serving as a voltage reference for measurement of the voltage at the current emitting electrode to be described. These two references are incorporated in FIG. 2 as will be described.

The location of the tool 10 in the well is determined by connecting a depth measuring instrument to the pulley 16. The depth of the tool 10 in the well is thus signalled by a depth measuring instrument 26, and that signal is supplied to a resistogram recorder 28. The resistivity which is measured by the resistivity logging system 10 is formed into a suitable output signal by a signal conditioner 30 and is also input to the recorder 28. The recorder 28 forms the resistogram shown in FIG. 4 as will be described.

The downhole logging tool incorporates a number of electrodes. The electrodes are electrically isolated from one another. There is a central electrode identified by the numeral 32, and it is located at the center of the array of electrodes. The array of electrodes is symmetrical above and below the central current emitting electrode 32. FIG. 1 shows the various electrodes deployed along the length of the body of the logging tool 10 electrically isolated from one another. The electrode 32 is electrically isolated from adjacent identical electrodes 34 and 36. The other electrodes are similar in construction, even to the top and bottom electrodes. The top electrode 38 is identical to the bottom electrode 40, and they are symmetrically deployed.

The central electrode 32 is at the mid point of the array. The electrodes 38 and 40 are a selected maximum distance apart, and twenty feet is a convenient distance. The electrodes 34 and 36 have a total span of two feet. The present invention contemplates altering the effective electrode length between two feet and twenty feet in the example given. Further, the intermediate electrodes are located at one foot intervals. This, therefore, yields an effective electrode length of two feet ranging up to twenty feet in increments of two additional feet.

Figure 2:
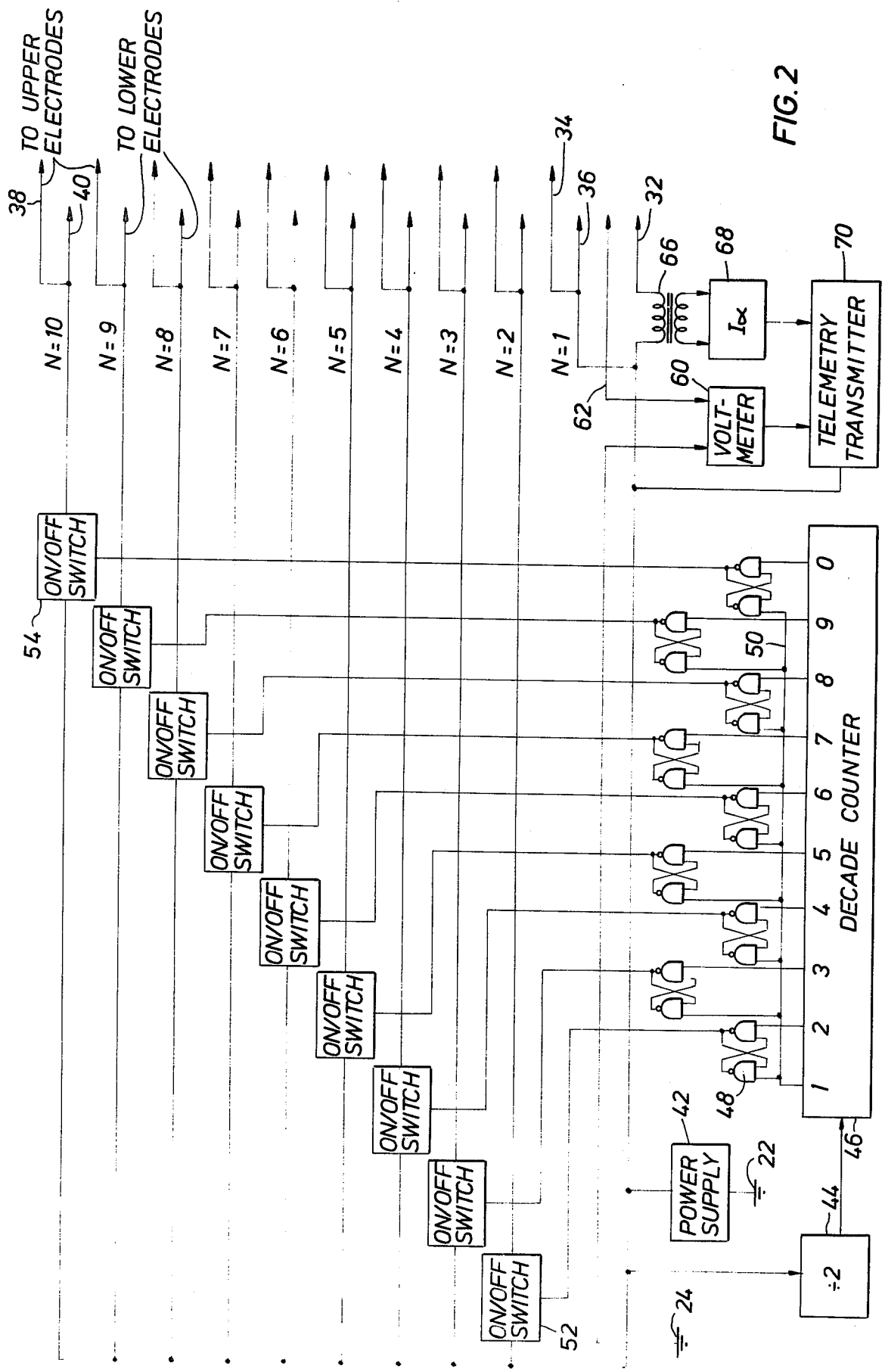
FIG. 2 is a schematic block diagram of circuitry incorporated in the present apparatus for controllably varying the effective width of the emitting electrode.

FIG. 2 depicts the control system for the array of electrodes. It will be observed that the current ground 22 is shown in FIG. 2. A suitable power supply 42 is connected to ground and forms a current output at the central electrode 32. The electrode 32 emits current which flows into the earth's formations to be returned through the current grounding electrode 22. The power supply provides a suitable voltage and current. As an example, it can be an AC supply operated at 400 hertz. This frequency is a convenient scale factor for the resistivity logging system and can also be used as a clock for control of the circuitry shown in FIG. 2. Under the assumption that the frequency is 400 hertz, that signal is input to a divider circuit 44 which divides by two. A 200 hertz output is input to a decade counter 46. Because the input is 200 hertz, the decade counter counts through ten steps twenty times per second and therefore provides twenty cycles of operation of the resistivity logging system. The decade counter has ten output terminals; the number of terminals is matched to the array of electrode pairs above and below the central electrode 32. The number of electrode pairs about the central electrode is represented by the number N (a whole number integer) and the decade counter preferably has N states also. The spacing is preferably uniform along the tool so that the electrodes arrayed about the central electrode are 2N times the uniform spacing or twenty feet in the preferred embodiment. Again, the spacing and the number N are scale factors which can be varied.

The decade counter 46 counts through a cycle of N or ten steps. It includes output terminals which are labeled one to N in FIG. 2. The closest electrode to the central electrode is preferably connected directly to the central electrode. To this end, FIG. 2 thus discloses the electrodes 32, 34 and 36 connected in parallel. For this reason, there is no off/on switch incorporated for the electrodes 34 and 36 although such a switch can be readily included.

The first and second output terminals of the decade counter are connected to a flip flop 48. The flip flop 48 is connected to a common reset line 50. The flip flop 48 is connected to an on/off switch 52. The switch 52 is similar to other switches including the switch 54, there being N minus one switches in the preferred embodiment. It will be recalled that the closest electrode pair (electrodes 34 and 36) does not have a switch and the number of switches is therefore reduced to N minus one. Since the switch 52 is intended for the second pair of electrodes (counting outwardly from the central electrode 32), it is powered by the second output terminal of the decade counter. It is switched on when the second count of the decade counter is observed. It is maintained on for a full cycle of operation and is switched off when the one count is observed at the reset line 50. In like fashion, the other off/on switches are operated in the same manner. They are switched on at the respective times that the decade counter observes their respective counts and they are all switched off by the common reset line 50.

Figure 3:
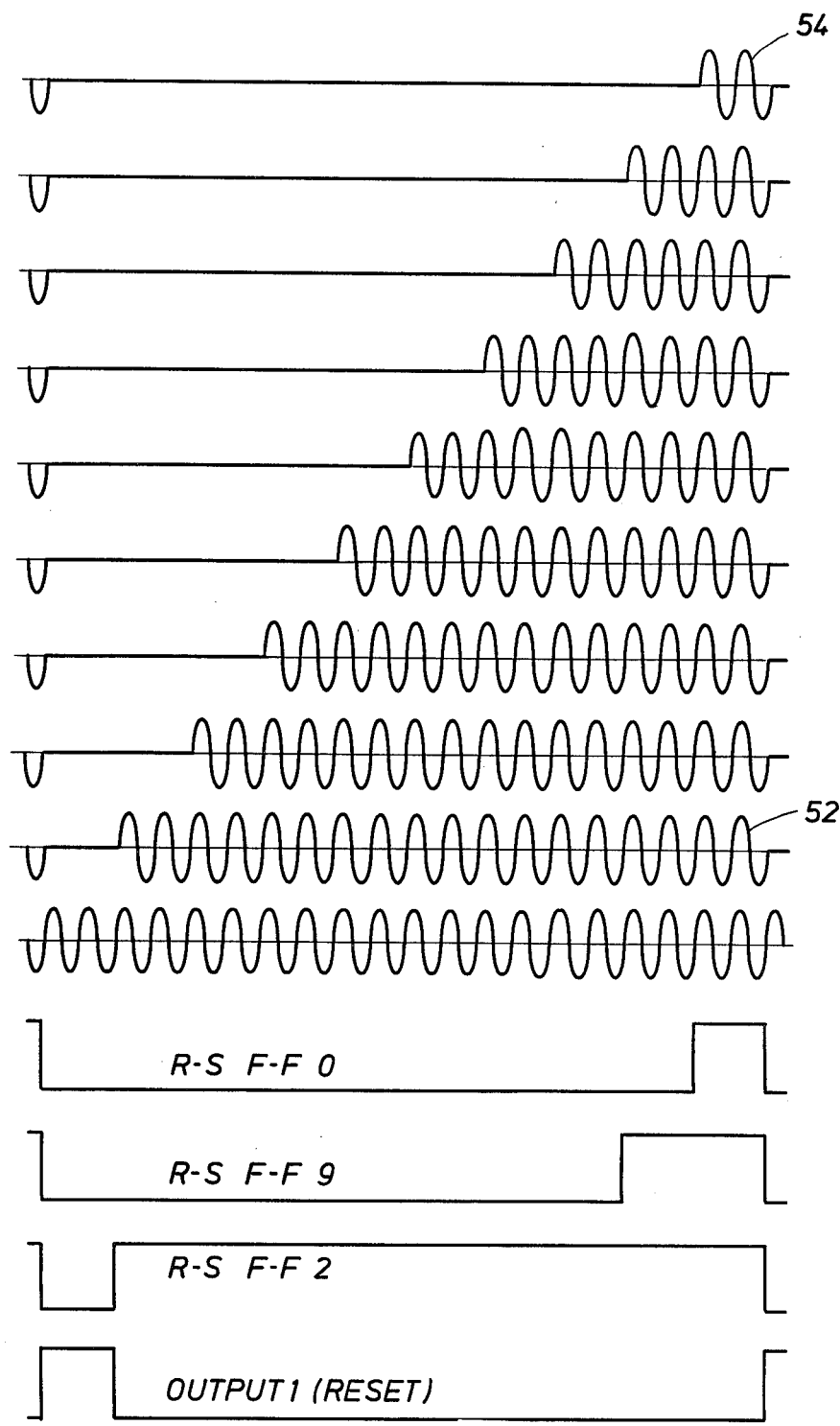
FIG. 3 is a timing chart of signals created by the circuitry of FIG. 2.

FIG. 3 is a timing chart showing the sequence in which the various switches are switched on. Two waveforms are labeled with the numerals 52 and 54 to identify those particular waveforms with the switches 52 and 54. As will be seen in FIG. 3, the switches are sequentially turned on and are maintained on so that the array of independent antenna electrodes are rippled, thereby increasing the effective width of the antenna array from two feet by two foot increments to a maximum width of twenty feet.

Operation of the present apparatus should be considered. Understanding of its operation is enhanced by reference to the timing chart of FIG. 3. At a given elevation, the central electrode 32 is operated to emit a current flow into the earth's formations. This current flow, in conjunction with the voltage of the terminal, yields a calculation of resistivity. The effective vertical span of the current emitting electrode is the smaller achievable dimension. That, in turn, is determined by direct connection of the emitting electrodes 34 and 36 in parallel with the central electrode 32. While the central electrode 32 might be only a few inches in width, the sum of the three central electrodes 32, 34 and 36 is only two feet. The current flow is radially outwardly into the formation but it is inevitably turned. Moreover, the array of emitting electrodes does not particularly force the current flow deep into the formation because it is a relatively narrow electrode array. While it is not a point source, it is certainly not a wide source and the current flow, therefore, turns upwardly in the formation. This tendency for the current flow to turn to the formations and thereby not penetrate deeply into the earth's formations enables a measure of near resistivity, namely the borehole resistivity. Ten steps are achieved during the cycle of operation. Thus, current flows for one-tenth of the interval of sweep occurring at twenty cycles per second. The electrode array, therefore, has the smallest dimension for approximately 0.005 seconds, and then the electrode array increases in size to the next incremental step. This is accomplished sequentially. The device steps from size to size. At each increase in size, the current flow is forced deeper into the formation. Deeper penetration is desirable to yield resistivity measurement of the deep formation. Because the resistances which comprise the path for the current flow are in series, it is important to know the resistivity measurements for the near distances (referring to the near borehole area) so that they may be subtracted to obtain the deep formation resistivity measurements.

The present invention further includes means for measuring the voltage. It will be recalled that FIG. 1 shows a voltage reference driven into the ground. The numeral 24 identifies this reference. That is connected by a suitable conductor to a volt meter 60. The volt meter 60 is provided with the reference input, and has an output conductor 62. The conductor 62 connects with a terminal 64 (FIG. 1) which is in ohmic contact with the borehole to provide the second voltage to be compared with the reference whereby the volt meter forms an output voltage measurement.

It will be recalled that the power supply 42 is connected to the central electrode 32. It is connected through a transformer 66, and the transformer, in turn, is input to an ammeter 68. It measures the current flow from the power supply to the electrode 32, and thereby forms a current measurement. Voltage and current measurements are then input to a telemetry transmitter 70 which has a suitable output up the logging cable for the signal conditioner 30 shown in FIG. 1. The transmitter 70 is synchronized by applying the output of the power supply 42 as an input to obtain synchronized operation.

It will be understood from the measuring equipment just described that the instantaneous value of resistivity is transferred to the surface. After measuring the voltage and current, the resistivity by signal conditioner 30 of FIG. 1 is obtained by the conversion of these two variables into resistivity.

Figure 4:
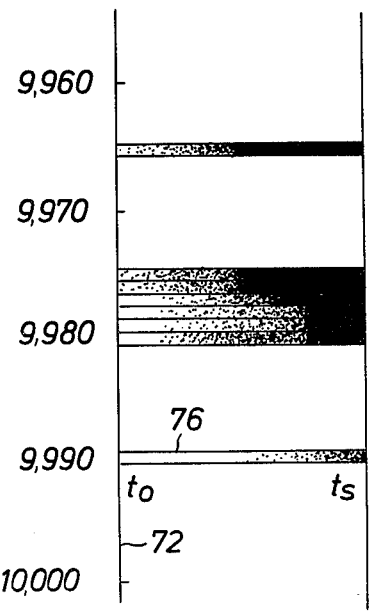
FIG. 4 is a resistogram of measurements in profile shown relative to the effective electrode length.

At the surface, the resistivity measure (being a function of the depth of current flow into the earth's formations) is recorded versus depth. The recorder 28 forms a resistogram. As shown in FIG. 4 of the drawings, the resistogram has a finite width, and the depth of hole is recording adjacent the ordinate 72. Moreover, FIG. 4 depicts the variations of effective electrode length by the straight line 74 as a function of time, and the measured resistivity is therefore plotted in the horizontal sweeps 76 shown in FIG. 4. In light of the fact that the logging tool is moved continuously, each sweep actually measures resistivity at a different elevation, and the sequential recorded lines for each sweep cumulatively paint the chart to form the resistogram shown in FIG. 4. The resistogram preferably varies in shades of gray and thereby reflects resistivity on a gray scale. The left hand edge at the ordinate 72 is the measure of resistivity near the borehole while the deep formation resistivity is at the right hand side of the resistogram.

While the foregoing is directed to the preferred embodiment of the present method and apparatus, the scope is determined by the claims which follow:

I claim:

1. An improved resistivity logging system for obtaining resistivity of earth formations at a plurality of radial depths from a well borehole, comprising:
    (a) an elongate tool body adapted to be lowered into a wellbore;
    (b) a central electrode on said tool body for injecting a current flow into the earth's formations;
    (c) means for measuring the resistivity of the earths formations as a function of current flow from said central electrode and the voltage difference between said central electrode and a reference ground electrode;
    (d) a plurality of current emitting guard electrodes symmetrically located along said tool body above and below said central electrode;
    (e) switching means associated with symmetrical pairs of said current emitting electrodes for connecting symmetrical pairs of said current emitting electrodes to said central electrode in a timed sequence to enable said current emitting electrodes to equalize in voltage to said central electrode to increase the effective length of said central electrode and thereby increase the depth of penetration of current flow from said central electrode into the earth's formation; and
    (f) means for determining the resistance of the earth formations as a function of said voltage difference and said current flow from said central electrode.

2. The apparatus of claim 1 wherein said central electrode and said current emitting electrodes are deployed along said tool body with said current emitting electrodes arranged in electrically insulated pairs uniformly spaced above and below said central electrode.

3. The apparatus of claim 2 wherein said means for connecting connects an electrode above said central electrode and an electrode below said central electrode in parallel with said central electrode simultaneously wherein said current emitting electrodes are equally spaced from said central electrode.

4. The apparatus of claim 3 wherein said current emitting electrodes are similar in construction and placement along said tool body.

5. The apparatus of claim 1 including recorder means for recording resistivity as a function of depth in the wellbore and said recording means forms a resistogram indicating resistivity as a function of radial current penetration into the earth's formations.

6. The apparatus of claim 5 wherein said means for connecting includes means for sequentially in timed sequence switching said additional electrodes into a circuit in parallel with said central electrode and the electrodes so switched are sequentially further from said central electrode to thereby increase continuously the effective width of said central electrode enhanced by said additional electrodes for a cycle of operation.

* * * * *